(12) United States Patent
Palma, Sr. et al.

(10) Patent No.: US 6,758,430 B1
(45) Date of Patent: Jul. 6, 2004

(54) METHOD OF WINDING MOTORS AND OTHER ELECTRIC MACHINES TO REDUCE AC LOSSES

(75) Inventors: Rodolfo Palma, Sr., Canton, MI (US); John C. Cooper, Dearborn, MI (US)

(73) Assignee: Aesop, Inc., Concord, NH (US)

( * ) Notice: Subject to any disclaimer, the term of this patent is extended or adjusted under 35 U.S.C. 154(b) by 0 days.

(21) Appl. No.: 09/249,885

(22) Filed: Feb. 16, 1999

(51) Int. Cl.$^7$ ............................................. H02K 15/09
(52) U.S. Cl. ...................................................... 242/433
(58) Field of Search ................................ 310/179, 198, 310/209, 223; 242/433

(56) References Cited

U.S. PATENT DOCUMENTS

| | | | |
|---|---|---|---|
| 2,442,587 A | | 6/1948 | Coggeshall et al. .......... 175/21 |
| 3,602,814 A | | 8/1971 | Quirk .......................... 324/137 |
| 3,662,460 A | | 5/1972 | Daley .......................... 29/605 |
| 3,872,897 A | | 3/1975 | Droll et al. ................. 140/92.1 |
| 4,187,441 A | | 2/1980 | Oney .......................... 310/112 |
| 4,495,430 A | * | 1/1985 | Herr et al. ................... 310/198 |
| 4,605,873 A | | 8/1986 | Hahn .......................... 310/154 |
| 4,780,635 A | * | 10/1988 | Neumann .................... 310/179 |
| 4,968,911 A | * | 11/1990 | Denk .......................... 310/179 |
| 5,177,423 A | | 1/1993 | Nakamura et al. ........... 318/767 |
| 5,519,266 A | * | 5/1996 | Chitayat ...................... 310/179 |
| 5,627,424 A | | 5/1997 | Steiner ........................ 310/258 |
| 5,714,822 A | * | 2/1998 | Kawano et al. ............. 310/179 |
| 5,942,830 A | * | 8/1999 | Hill ............................. 310/179 |
| 6,011,338 A | * | 1/2000 | Bell et al. .................... 310/198 |

\* cited by examiner

Primary Examiner—Emmanuel M. Marcelo
(74) Attorney, Agent, or Firm—Gifford, Krass, Groh, Sprinkle, Anderson & Citkowski, PC

(57) ABSTRACT

Non-random windings are employed to reduce the proximity effect in electrical machines, including rotating machines such as various types of motors. Thus, with respect to electrical machinery of the type wherein multi-strand electrical wiring is received within a slot relative to a surface associated with the transmission of magnetic flux, a method of dressing the wiring within the slot according to the invention includes the step of winding the strands of each turn in one or more layers, each layer being substantially parallel to the surface associated with the transmission of magnetic flux. The winding may be a multi layer winding, in which case the windings associated with each layer are preferably separated by an insulating layer. The invention is applicable to various types of machines and motors, including AC, brushless DC and variable reluctance (VR) types. The conductors may be of a circular cross section or other geometry, such as flattened tapes.

9 Claims, 6 Drawing Sheets

(1 of 6 Drawing Sheet(s) Filed in Color)

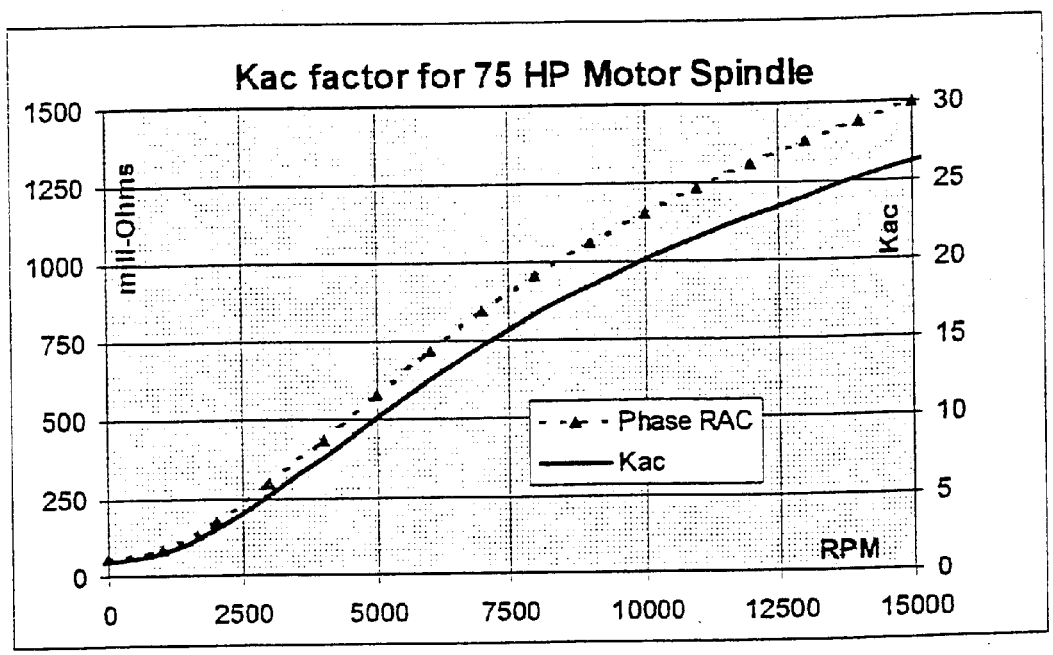
*Fig - 10*
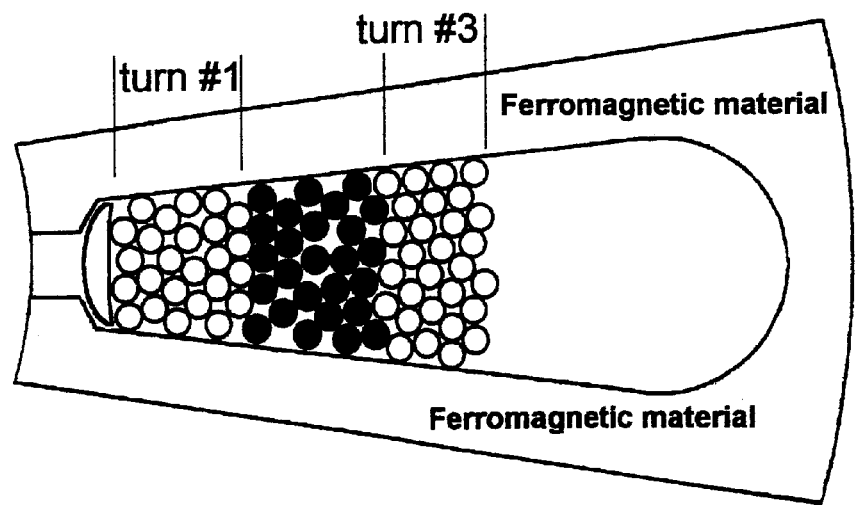
*Fig - 11*  radial direction

METHOD OF WINDING MOTORS AND OTHER ELECTRIC MACHINES TO REDUCE AC LOSSES

FIELD OF THE INVENTION

The present invention relates generally to electrical machinery and, in particular, to a method of winding motors and other electrical machinery having windings with multiple wire strands that in turn reduces AC or proximity losses and prevent overheating.

BACKGROUND OF THE INVENTION

Electrical machinery of the type having multiple windings has been in development for over a century. A vast array of electromechanical rotating machinery has become available, including various types of AC and DC motors, generators, and other equipment for both single-phase and multi-phase operation.

In winding the armatures and field coils for such machines, it is common practice to pack the windings as tightly as possible to achieve the greatest amount of conductor density for a given cross-section. However, the same amount of attention is has not been given to the precise way in which the various strands are laid into their respective slots. In conventional electric machine windings, the conductors are randomly distributed within the slots, and are typically referred to as "random windings." FIGS. 1 and 2 show examples of random windings having multiple wire strands per turn, with FIG. 1 illustrating the particular case of a single layer winding, and FIG. 2 illustrating a double layer winding utilizing an insulating layer to one or more phases. In these drawings, the number in each wire indicates the number of the turn to which that wire strand belongs.

FIGS. 1 and 2 are not meant to depict any electrical machine in particular, but rather, are intended to present the cross-section of a typical arrangement wherein, notably, the strands of one winding are intermingled in random fashion with the strands of another, resulting in an uncontrolled distribution between the strands of one winding and the strands of another. Although, as shown in FIG. 2, the insulating layer provides a barrier between the phases, the strands of each winding are still randomly distributed within each phase.

Although it is well known that losses may occur through self-induction when conductors carrying dissimilar currents are maintained in close proximity to one another, the precise affect of randomly distributed multi-strand windings in electrical machinery has not been known or predictable. This is due to the fact that, in the absence of advanced investigative techniques such as finite-element analysis (FEA), it has heretofore been impossible to precisely determine the source(s) of such losses.

In addition, particularly with respect to certain rotating machinery, the width-to-length ratio associated with the slots used to hold the windings has not been as pronounced. In particular, whereas in the past this ratio has been on the order of 2:3, very deep narrow slots are being used to increase efficiency, and this increases the likelihood that the strands may be randomly distributed with respect to the depth of the slot, thereby exacerbating the proximity effect. Furthermore, higher frequency machines are being designed, which manifests as an increase in the ratio of AC resistance to DC resistance.

SUMMARY OF THE INVENTION

Broadly, and in general terms, the present invention utilizes non-random windings to reduce the proximity effect in electrical machines, including rotating machines such as various types of motors. That is, to reduce the proximity effect, and the additional losses and overheating associated therewith, a method of the invention abandons the random winding technique used for decades in the construction of standard industrial electric motors in favor of a more controlled arrangement.

Thus, with respect to electrical machinery of the type wherein multi-strand electrical wiring is received within a slot relative to a surface associated with the transmission of magnetic flux, a method of dressing the wiring within the slot according to the invention includes the step of winding the strands of each turn in one or more layers, each layer being substantially parallel to the surface associated with the transmission of magnetic flux. The winding may be a multi layer winding, in which case the turns associated with each layer are preferably separated by an insulating layer. The invention is applicable to various types of machines and motors, including AC, brushless DC and variable reluctant (VR) types. The conductors may be of a circular cross section or other geometry, such as flattened tapes.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 10 is a plot showing the Kac factor with respect to a 75 HP test motor as function of motor speed;

FIG. 11 show how non-random windings may be used to minimize the proximity effect in multiple strand windings according to the invention. In particular, the strands belonging to the same turn are in radial layers, so even when their position may not be fully determined, they are not fully random either. Although this figure shows only the three layers closer to the slot opening, the other turns follow the same pattern;

DETAILED DESCRIPTION OF THE INVENTION

Through the use of advanced probative techniques such as finite element analysis (FEA), and other tools, this invention addresses overheating inefficient electrical machines such as electrical motors. As will become evident below, through experimentation and empirical tests, the cause of overheating was found to be due to proximity losses resulting from random windings of wire turns within slots, including wires having multiple strands. This phenomenon was discovered while building and testing a high-speed 75 HP spindle motor, which was found to overheat during conditions which should otherwise have been within tolerance. Although the detailed description focuses on this particular motor and the techniques whereby the proximity effect and overheating were reduced, it must be kept in mind that the invention, overall, is applicable to the reduction of AC losses in various types of electrical machinery having multiple windings, including AC, brushless DC, VR motors and all other machines having alternating currents and multiple wire strand wirings.

Referring once again to the 75 HP spindle motors which were constructed and built for test purposes, it was found that the first units according to the proposed design overheated. The motor delivered the expected electromagnetic torque, but it could not sustain the expected torque due to the overheating. Also, the motors delivered the expected rating at high speed with the parallel connection of their windings, but at low speeds using a series connection for the windings, the motors overheated. The following test at zero speed was therefore conducted. The motor was fed DC and its temperature rise was recorded. Then 60 Hz was fed to the motor at same current level. The recorded temperature at 60 Hz was substantially higher than that in the DC test.

Figure 3:
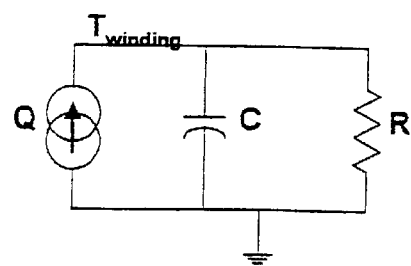
FIG. 3 provides a simple thermal model of an electrical machine including a heat source Q, a thermal capacitance C, and a thermal resistance R.

As shown in FIG. 3, a simple thermal model of the machine includes a heat source Q, a thermal capacitance C, and a thermal resistance R. This model allows one to predict the final temperature knowing the motor power losses, or to determine how much power losses are required to obtain a certain temperature rise in the windings.

From previous experience, the following thermal parameters were used: R=37.037° K/kilowatts, and C=0.1 kilowatts*min/° K, with Q being power loss in kilowatts. The final temperature is given by:

$$T_f = Q \times R + T_o$$

where $T_o$ is the ambient (and initial) temperature.

The time variation of the temperature for a step of power Q (heating cycle) is:

$$T_{on}(t) = T_o + (T_f - T_o) - (1 - e^{-kt})$$

and when the loss power is removed (cooling cycle):

$$T_{off}(t) = T_o + (T_2 - T_o)e^{-kt}$$

If the heating and cooling cycles have a time duration of $T_1$ and $T_2$, the duty cycle D is defined as:

$$D = \frac{T_1}{T_1 + T_2}$$

and the temperature follows a time variation having a peak temperature of about 225° Celsius. Under continuous operation, however, the peak temperature is about 240° C., or some 15 degrees higher.

In any case, the overheating was still too high for the machine to work under continuous operation. One common solution to this situation is to derate the machine, wherein the maximum power that the machine delivers in continuous operation is limited so the temperature rise is within the values accepted to guarantee the life of the insulation. In our case, the de-rating option was unacceptable, since the de-rated power (about 40 HP) will be well under its initial target (75 HP). It was therefore required to find and solve for the cause of overheating.

There are two major causes for overheating. The first is that the thermal system is poorly designed or built. The second is that the power loses are larger than expected (or predicted by the design), due to an improper design, a poor selection of materials, a manufacturing problem, or some combination of these. The thermal circuit was reviewed, and the parameters obtained (values R and C, above) were well within the expected range.

Sources of Loss

Machine losses were then examined. Motor power losses of this kind can be divided in four types: core losses, mechanical losses (windage, friction, etc.), winding losses ($I^2R$), and additional losses. The core losses are a function of the power dissipated in the magnetic circuit laminations. Experimental measurements as well as results from both the design code and finite element analysis showed that the core losses were within the expected values and were not the cause of overheating. The mechanical losses are due to friction and windage. The mechanical losses were measured and fell within the expected range.

The winding losses result from power dissipated in the coils and connectors. Additional losses are all those losses that are not normally included in the above classifications, such as losses in structural members and non-electromagnetic parts (bolts, cooling jacket, supports, bearings, shaft-extensions, an so forth). Additional power losses could also come from a defective manufacture or condition, such as short circuits between the laminations that will increase the core losses. Or power losses may be induced in the end regions of the motor, or in the surface of the magnets.

A finite element model of the motor end region showed that the power losses in the end region were much lower than the power required to heat the motor to the temperatures measured. There was a clear indication of eddy currents in these locations. However, the computed eddy current losses are:

| Losses by Region: | Value (Watts) |
|---|---|
| Rotor | 145 |
| Water jacket and bearings | 117 |
| Core first laminations | ~8 |

According to the above, the total loses in the end region should be equal to about 270 Watts, which is insufficient to raise the temperature to the experimental values encountered. We concluded that this was not the source of power losses that produced the measured temperature rise.

This left the winding as the only potential source for the 2970 Watts of power losses required by the thermal model. Conventional wisdom in motor design has dictated that the power losses in the main winding are given by:

$$P_w = 3I^2 R$$

where I is the effective value of the current and R is the DC resistance in Ohms of the winding for one phase. The coefficient 3 is for a 3-phase motor. In our Case, R=74 mΩ/phase, and I=80 Amps, so $P_w$=1420 watts. This is roughly half the 2970 watts required by the thermal model. The winding resistance was measured and its values were again found to be within the expected design and manufacturing tolerances.

The results of the test at zero speed with DC and AC indicate that some form of induced currents were increasing the power losses inside the motor. We investigated the possibility of shorted turns inside the winding, and among different winding phases, which could be responsible for this additional loss. Careful measurements of the resistances of each winding segment proved that there were no shorted turns or shorts among the windings.

The only explanation for the increase in the winding losses is that the effective value of the resistance R in the expression $P_w = 3I^2 R$ increases by a factor of 2.0 when 60 Hz is applied to the windings.

Winding Losses with AC Currents

The power losses in the windings are described by the equation $P_w = 3I^2 R$. However, the resistance R is not the DC resistance, but it depends on the current distribution inside the conductors when AC current is considered. If the current distribution inside each conductor is uniform, (as in the DC case) the resistance is given by the well-known formula:

$$R = \rho \frac{L}{A_{cond}}$$

where ρ is the conductor electrical resistivity, L is conductor length, and $A_{cond}$ is the cross sectional area of the conductor. An AC current through a wire creates a magnetic field that re-distributes the current inside the conductor, so the current density is larger on the outer periphery of the wire. This is the well known "skin effect," and the skin depth gives the penetration at which the current decays by 67% of its value at the surface. For isolated circular wires, the skin depth is given by:

$$\delta = \frac{2}{\omega \mu \sigma}$$

where ω is the electrical angular frequency of the sources, μ is the magnetic permeability, and σ is the electric conductivity of the material.

For copper, the skin depth is δ=9 mm at 60 Hz. This means that if the conductor has a diameter smaller than 18 mm, the skin effect at 60 Hz is negligible, and it is acceptable to use the DC value of the resistance, as motor designers often do. Our 75 HP motor has windings with stranded wires of 21 AWG, which have a diameter of 0.724 mm, which is just about ½₅$^{th}$ of the skin depth. As such, we concluded that the skin effect was not a significant factor in this motor design.

The Proximity Losses in Windings

The so-called proximity effect is produced by currents circulating inside the conductors. These circulating currents are induced by the magnetic field of other conductors in the proximity of the conductor under consideration. These circulating currents inside the conductors do not significantly alter the source currents, but they can produce significant losses.

Figure 4:
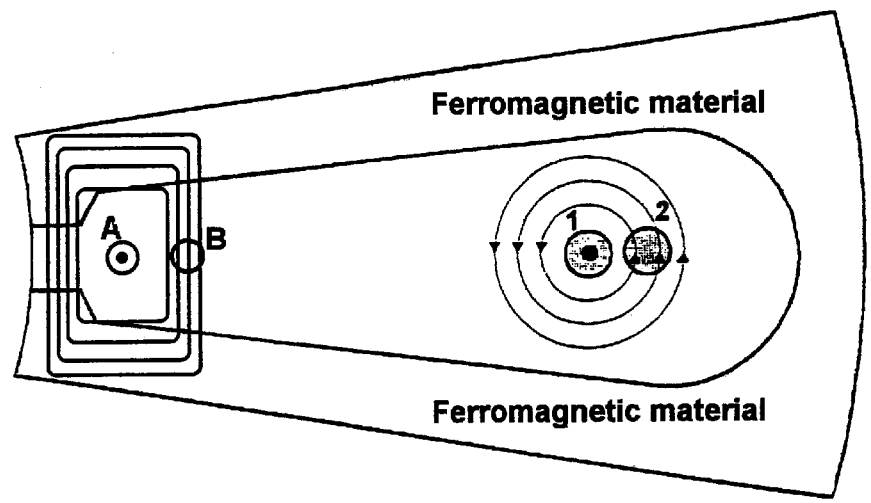
FIG. 4 illustrates how an external, time-variant magnetic field re-distributes the current density within a conductor, giving rise to the "proximity effect" responsible for the resistance increase over its DC value.

The proximity effect is enhanced, and becomes significant, when conductors are surrounded by ferromagnetic material as when they share the same motor slot. Consider conductor 1 carrying an AC current, as depicted in FIG. 4. This current will produce a magnetic field around the conductor 1 which will cross conductor 2, and induce currents within the adjacent conductor. Consider now a conductor such as A in the figure which carries an AC current and is closer to the ferromagnetic walls of the slot. The field created by A is larger than the field created by the same current in a conductor in open space, since the ferromagnetic laminations increase the flux density. The larger the flux density produced by a wire, the larger the induced currents in a neighboring wire.

Figure 5:
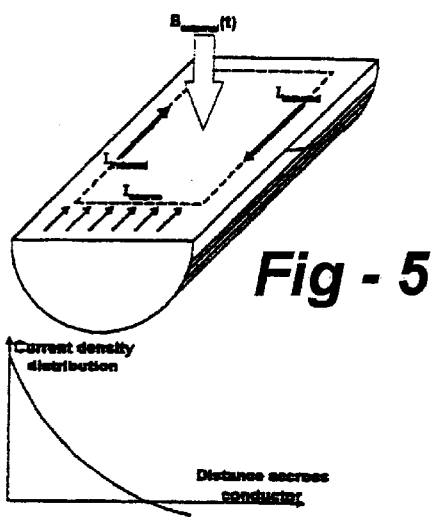
FIG. 5 shows the cross section of a motor's stator with. some AC-carrying conductors inside a slot. Conductors 2 and B will have induced circulating currents due to the proximity effect.

The proximity effect causes an increase in power losses, reflected as an increase in the conductors resistance over its DC value, when conductors carry time variant currents and they are in close proximity. The external field produced by the rest of the conductors over a particular wire, induces circulating currents inside the wire that produce power losses. FIG. 5 shows a cross section of a conductor that is crossed by an external AC field, $B_{external}$.

The proximity effect may be quite significant when there are many layers of conductors embedded in a material of high magnetic permeability such as iron, and when the ratio between the turn's dimensions to the skin depth (δ) is high. This is exactly the situation of the conductors in the slots of the motor under investigation, and this is the cause for the increase of the resistance over its DC value. The losses in effect are the main cause of the excessive overheating of the motor.

Finite Element Model of the Proximity Effect and Losses

Figure 6:
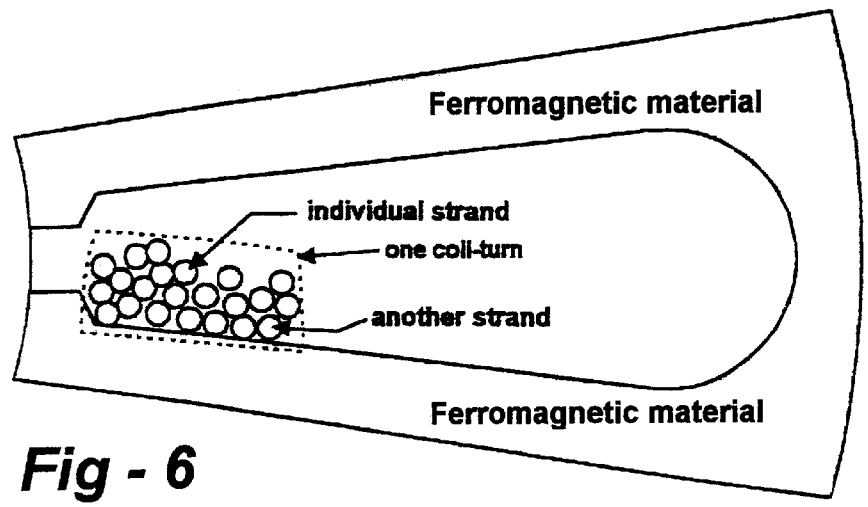
FIG. 6 is a slot cross section showing the location of a single turn made up of 24 strands in a motor winding used to investigate the proximity effect.

FIG. 6 shows the cross section of the spindle motor slot and the approximate location of one of the turns. Each turn consists of 24 strands of 21 AWG wire, and it is impossible to know the exact location of each strand. Each coil-turn is made of strands since is not practical—from a manufacturing consideration—to make each turn of a single solid conductor. In addition, a single conductor can be affected by the skin effect as described above.

Figure 7:
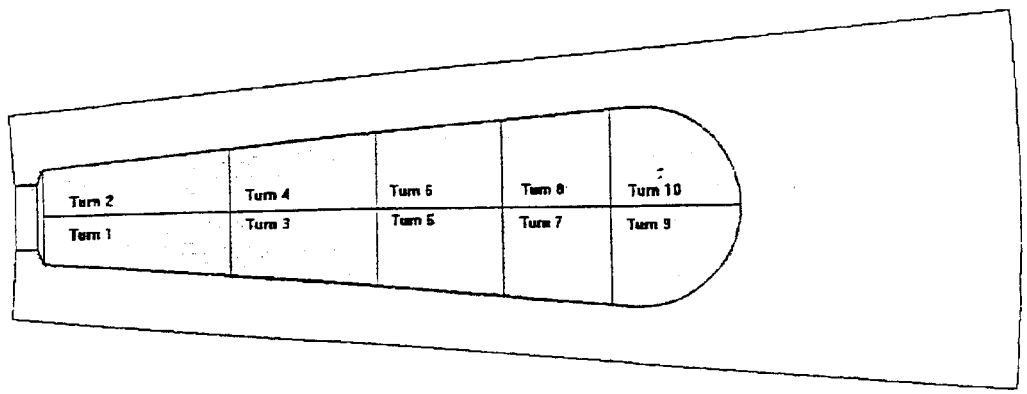
FIG. 7 is a slot cross section and coil arrangement in a 75 HP spindle motor used to investigate a solution to the proximity effect made possible by the invention.

For the FEA model, the strands were considered as having no transposing from one slot to the next. Since the FEA model has none of the manufacturing restrictions, we considered each turn as a solid conductor, as shown in FIG. 7, and we assigned an arbitrary location and rectangular shape to the whole strand bundle (turn), so the total area of each turn is the same and they cover the whole slot section.

Figure 8:
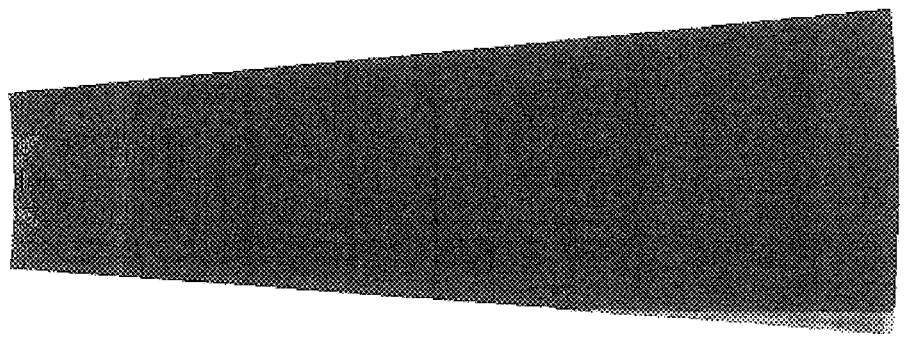
FIG. 8 is a diagram which shows magnetic flux density and equipotential lines in a slot carrying a single phase coil.
Figure 9:
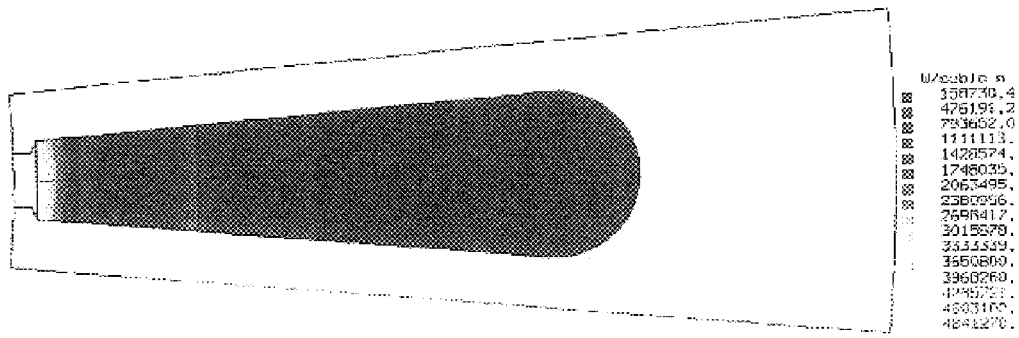
FIG. 9 is a diagram which shows current density distribution with respect to series connected turns.

All the coil-turns carry the same (source) current and are connected in series. Each turn could have a different circulating current due to the proximity effect. FIG. 8 shows the magnetic flux density and the equipotential lines according to the FEA result. In this figure one can appreciate the flux lines crossing through the slot. These flux lines represent the flux that produces the non-uniform current density inside the conductors: i.e., the "proximity effect." FIG. 9 shows the non-uniform current distribution inside the conductors that form the individual turns (FEA result).

Proximity Effect Factor Kac, for the 75 HP Spindle Motor

The proximity effect manifests as an increase in the power losses in the winding conductors. This power increase occurs with no significant change in the source current, and then can be represented from a circuit point of view as an increase in the winding resistance. Then equation P=R I² is still valid, and we need to use Rac instead of the DC value. Then, we may define the proximity effect Kac as the ratio between the ac resistance to the dc resistance of the winding, i.e., Kac=Rac÷Rdc FIG. 10 shows the factor Kac(=Rac/Rdc, the ratio of the phase resistance) and the motor phase-resistance of the present motor design as function of the motor speed. In reality the proximity factor is a function of the frequency, but the frequency is related to the motor speed, by the following expression:

f=P/60 RPM where f is the frequency of the currents in Hertz, p is the number of pairs of poles (3 in our case), and RPM is the motor velocity in RPM. This means that the horizontal scale may be easily scaled to frequency by multiplying it by ⅟₂₀

Reducing the Proximity Effect

To solve the problem, we looked for ways to reduce the proximity effect with minimum changes in the spindle and its motor. We considered two alternatives with respect to the high-speed spindle motor. Both of them were considered minimal changes to the overall spindle, since they involve changes in the motor stator only, and the proposed modifications keep the same inner and outer stator diameters.

One solution involved the use of non-random windings to reduce the proximity effect in machines with stranded conductors. That is, to reduce the proximity effect (and its additional losses and overheating) we would abandon the random winding technique used for decades in the construction of standard industrial electric motors. The proximity effects are not significant in "single conductor per turn windings," and in machines where the aspect ratio of the slot is smaller than 1:4. This is one of the reasons why random winding has been acceptable until now.

In windings with many strands per turn and/or with narrow slots, the proximity effect could be significant, and the additional winding losses, especially at high frequencies, can be 10 or more times the losses at DC. As the operating frequencies of machines increase beyond the traditional 60 Hertz, as in brushless DC machines, the proximity effect becomes very significant. Once heat transfer is optimized, the only option to increase the output power of the motor in continuous operation is to reduce its losses.

To reduce the proximity losses, the motor needs to be wound using a non-random winding technique. We studied a number of design changes, but being able to maintain the same motor dimensions and avoid changes to the spindle is the most economical alternative. So we kept the same rotor and stator and the same slot design, only the winding was modified. Further reduction in the proximity effect can be obtained by winding the existing stator using a double layer winding. This reduction of the proximity effect comes from that the total magneto motive force (MMF) in the slot, with currents but of phase, is smaller than the MMF when the currents in the slot are in phase. This reduces the MMF by a factor of ½√3.

To maintain the same level of torque, the turns per coil were increased 20 percent over the original design. The number of strands were increased to 24 from 22, and the wire reduced to 22 AWG instead of 21 AWG. Since the motor resistance changes with the winding pattern, and the thermal circuit of the machine does not, we define the loss coefficient ($K_{loss}$) as the ratio of the power losses of the new design to the DC winding losses in the original (base) design. That is:

$K_{loss}$=Winding Losses÷DC winding loss of Base Motor

Ideally, we would like to have zero losses due to the proximity effect, which corresponds to $K_{loss}$=1. We designed a new stator having 18 slots, which allows the slot ratio depth/width to be smaller and thus to reduce the proximity effect. This design also allows to reduce the DC resistance which reduces the winding losses even further.

Solutions to the Proximity Effect

FIG. 11 shows how non-random windings may be used to minimize the proximity effect in multiple strand windings according to the invention. In particular, the strands belonging to the same turn are in radial layers, so even when their position may not be fully determined, they are not fully random either. Although this figure shows only the three layers closer to the slot opening, the other turns follow the same pattern. The aspect ratio of the slots is now 2.1 compared with 4.9 in the 36-slot design.

Figure 12:
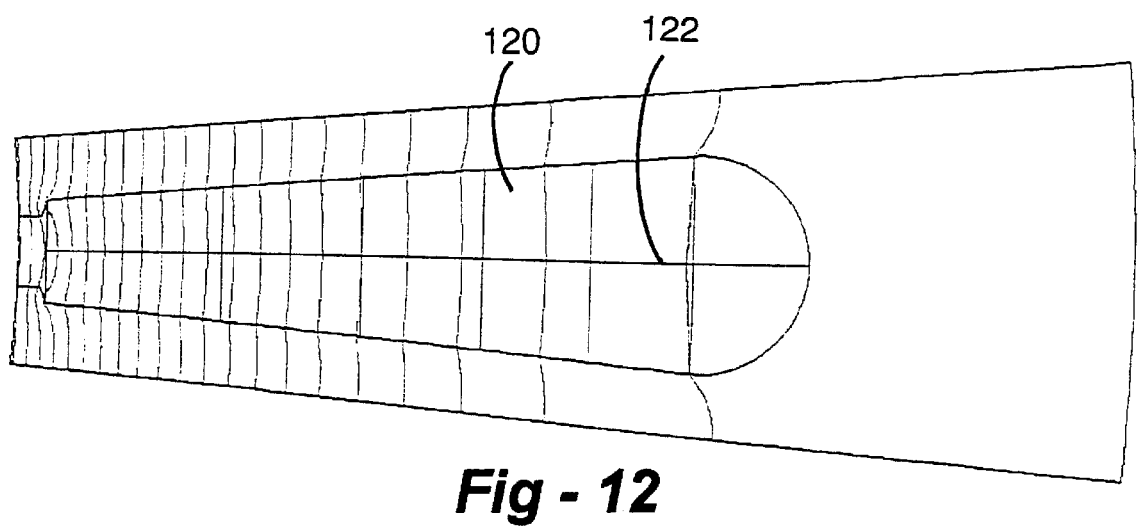
FIG. 12 is a drawing which illustrates layer winding magnetic equipotential lines at 125 Hz.

FIG. 12 shows the flux lines across the slot, 120 defining an axis 122, which are more uniformly distributed than those in FIGS. 8 and 9. This indicates that the flux density for this type of slot is more uniform and smaller than that associated with narrower slots. Considering this, the wider slots should have a further reduced proximity effect.

Figure 1:
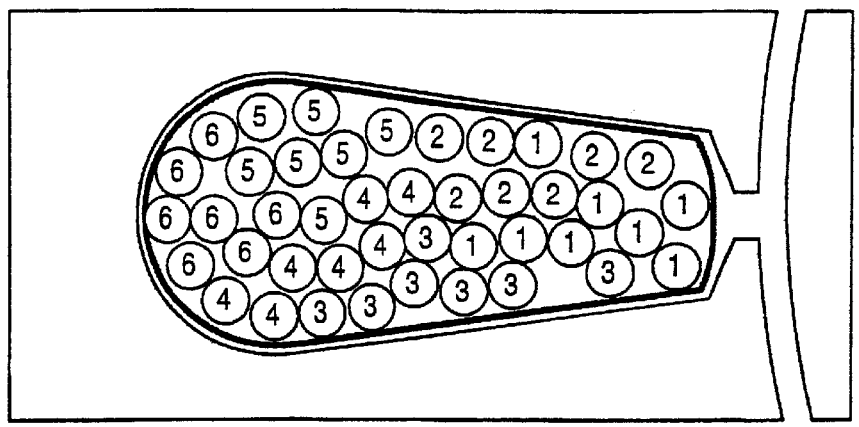
FIG. 1 represents an example of random windings having multiple wire strands per turn, illustrating the particular case of a single layer winding.
Figure 2:
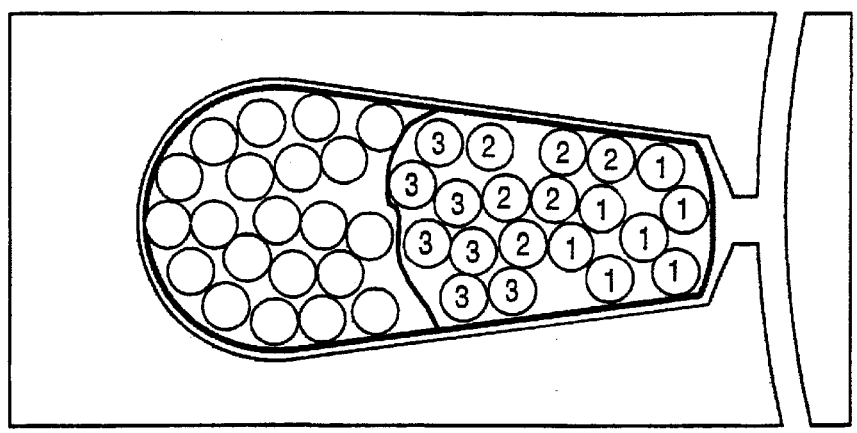
FIG. 2 represents a different example of random windings having multiple wire strands per turn, in this case illustrating a double layer winding utilizing an insulating layer to separate the phases.
Figure 13:
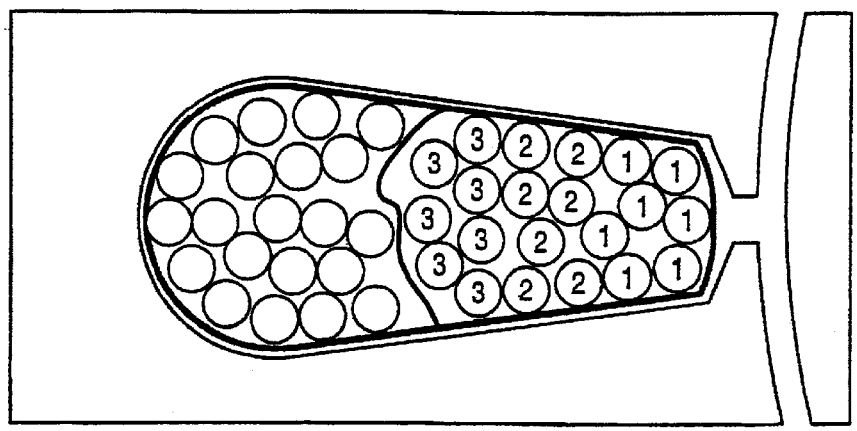
FIG. 13 illustrates a preferred arrangement of windings within a slot having multiple strands according to the invention.

FIG. 13 illustrates a preferred arrangement of windings according to the invention within a broader slot. Note that the strands are not random, but are arranged in a controlled manner. In particular, the wire strands of each turn are layered in consecutive radial layers, as shown, such that the strands of the outermost turn are preferentially arranged in a closed tight tangential bundle to minimize losses due to the proximity affect. FEA modelling shows that such a winding results in approximately half of the losses associated with the windings shown in FIG. 2.

Figure 14:
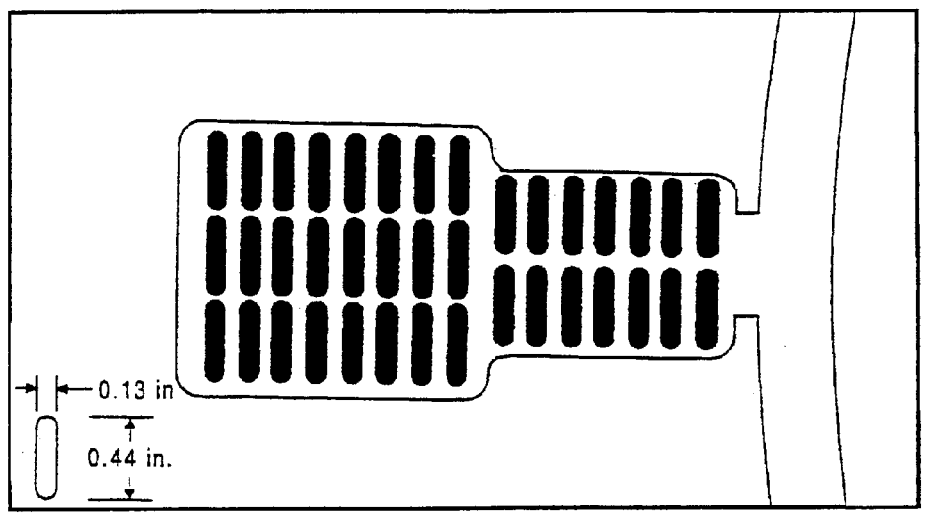
FIG. 14 illustrates an alternative arrangement according to the invention utilizing tape conductors.

FIG. 14 illustrates an alternative arrangement wherein, instead of wires having a circular cross-section, tape conductors are used within a non-straight slot. In our particular design, each tape has a width of approximately 0.744 inch and a thickness of approximately 0.13 inch, though such design may be varied in accordance with the type of machine, power requirements, and so forth.

Figure 15:
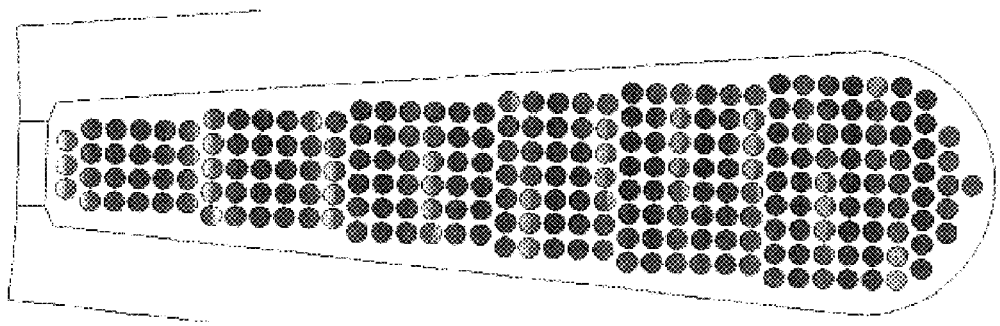
FIG. 15 is a plot showing magnetic fields in current distribution inside a slot having multiple wire strands per turn having been wound in a non-random fashion.

FIG. 15 illustrates a finite element analysis conducted with respect to the magnetic field and current distribution within a slot having multiple wire strands per turn. Note the more even distribution of the magnetic field and current within the slot, as compared to non-controlled designs discussed above.

Figure 16:
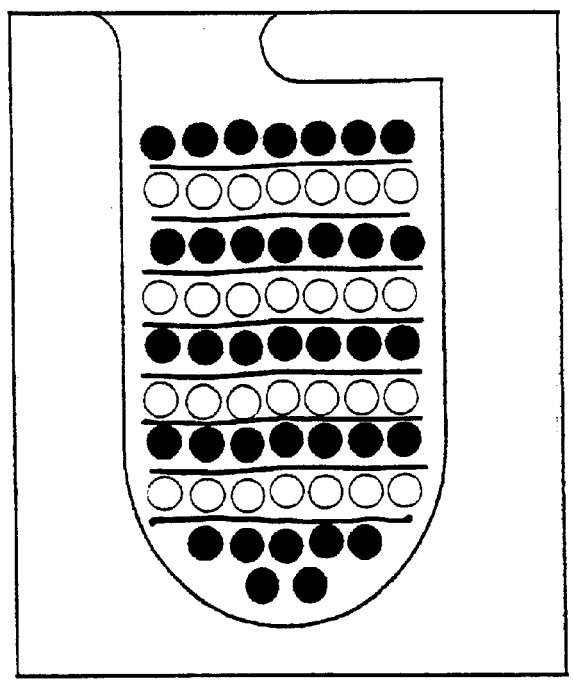
FIG. 16 illustrates a non-random winding within having an asymmetrical opening according to the invention.

FIG. 16 illustrates a non-random winding within a slot having asymmetrical opening. In this particular case, winding is carried out in a single layer, with nine turns and seven strands per turn though, again, variations on this particular theme are possible depending upon the application. Notice that the strands of each winding are basically sorted into layers, such that each layer of wires contains only strands of the same turn, with the exception of the bottom layer, which, in this case and others, must conform to the rounded nature of the bottom of the slot.

We claim:

1. In electrical machinery wherein multi-strand electrical wiring is received within a slot defining an axis, a method of dressing the wiring throughout the entire slot, comprising the step of:

winding the strands of each turn in one or more contiguous layers in a non-random fashion, each layer being substantially perpendicular to the axis of the slot.

2. A piece of machinery manufactured according to the method of claim 1.

3. The method of claim 1, further including the step of separating at least two of the contiguous layers with an insulating layer.

4. A piece of machinery manufactured according to the method of claim 3.

5. The method of claim 1, including the step of providing the strands in the form of tape conductors.

6. In an electrical motor wherein multi-strand electrical wiring is received within a slot defining an axis, a method of dressing the wiring throughout the entire slot, comprising the step of:

winding the strands of each turn in one or more contiguous layer in a non-random fashion, each layer being substantially perpendicular to the axis of the slot.

7. The method of claim 6, further including the step of separating at least two of the contiguous layers with an insulating layer.

8. An electrical motor manufactured according to the method of claim 7.

9. The method of claim 6, including the step of providing the strands in the form of tape conductors.

* * * * *